United States Patent Office 3,511,098
Patented May 12, 1970

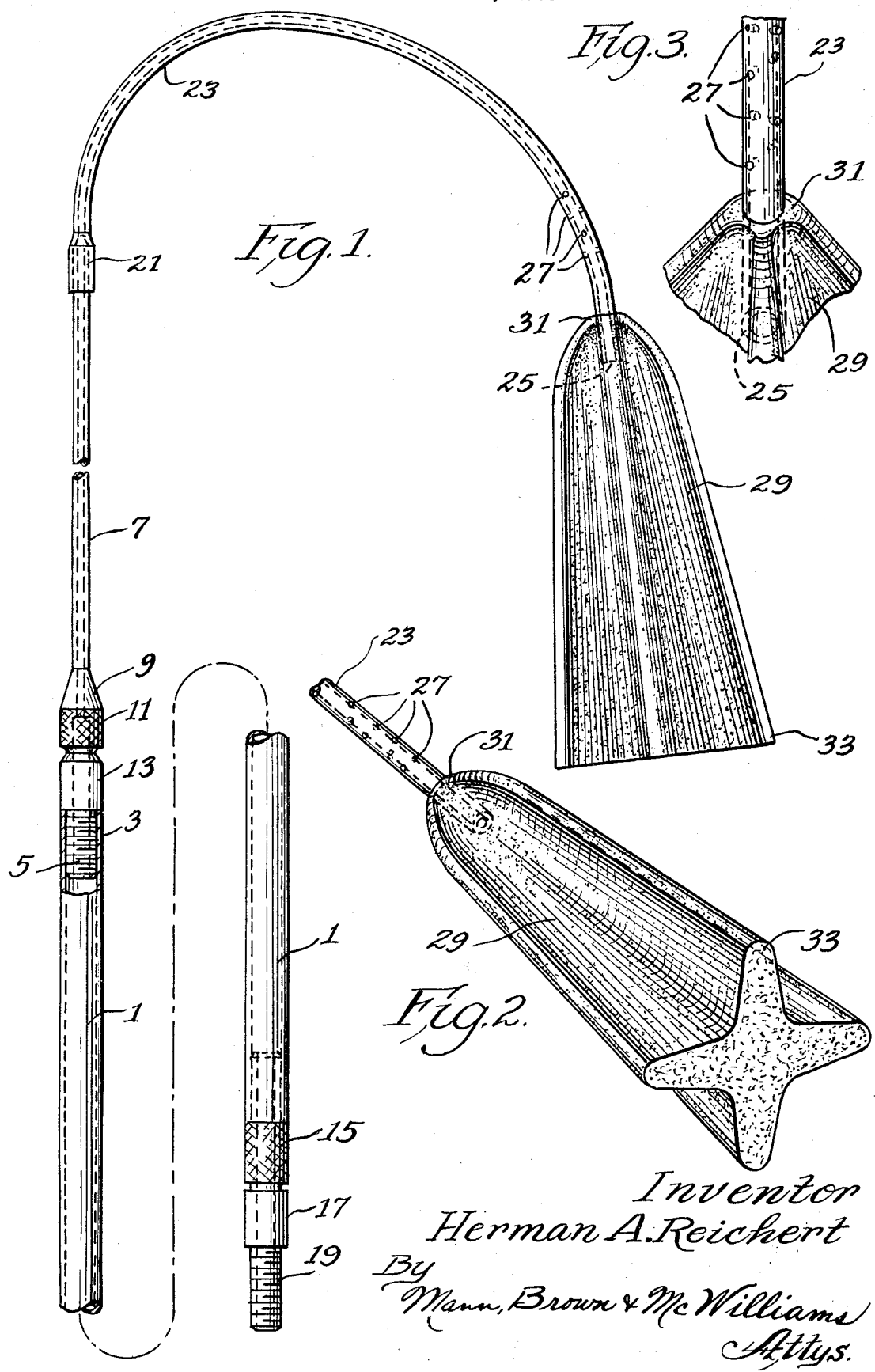

3,511,098
STATIC PRESSURE SENSING DEVICE
Herman A. Reichert, Michigan City, Ind., assignor to Dwyer Instruments, Inc., a corporation of Indiana
Continuation-in-part of application Ser. No. 727,882, May 9, 1968. This application Nov. 13, 1968, Ser. No. 775,257
Int. Cl. G01l 7/00
U.S. Cl. 73—388
6 Claims

ABSTRACT OF THE DISCLOSURE

Static pressure in a gas stream flowing through a duct can be more accurately measured by attaching a universal joint connection member, such as a piece of thin flexible tubing having small, clean, burr-free holes adjacent its free end to act as pressure sensing pickup points, to the end of a piece of rigid tubing, fastening to the free end of the flexible tubing, vanes, fins or other device which will cause the free flexible tubing end to trail out and align itself with the gas stream, and inserting the flexible tubing into the duct in which gas pressure is to be measured. Inaccurate signals which are caused by turbulence are thereby eliminated. In the preferred embodiment the device for causing the tubing to trail out is made of light weight material which can be deformed or compressed to a fraction of its normal size and recover its normal size and shape upon release of compression, such as flexible foamed polyurethane suitably formed or shaped with vanes or fins. This enables the sensing end of the device to be inserted and withdrawn through a very small hole in the duct.

CROSS-REFERENCE TO RELATED APPLICATION

This application is a continuation-in-part of application Ser. No. 727,882 entitled, "Static Pressure Sensing Device" filed May 9, 1968, and the entire disclosure in said application is incorporated herein by reference.

BRIEF SUMMARY OF THE INVENTION

Static pressure sensors currently in use, generally consist of a straight tube or a bent tube type pickup inserted in a duct through which a current of air or other gas is flowing. The devices now in use are direction-sensitive and tend to give somewhat inaccurate signals when turbulent flow conditions are encountered. In order to try to avoid this drawback, such devices are placed as far as possible from elbows, obstructions, or locations of duct-size expansion or contraction to eliminate as far as possible the turbulence caused by these factors. The difficulty, however, is that under practical conditions met with, the duct system contains air filters, air conditioning units, and/or heat coils and it is usually not possible to find a point sufficiently spaced from such obstruction to get an accurate reading.

It is one of the objects of the present invention to provide a static pressure sensitive device which eliminates the inaccuracies caused by turbulence, as well as by meandering or angular flow within the duct. Another object of the invention is to provide a static pressure sensitive device which is able to align itself with the true gas flow direction at the point where the reading is taken. A further object of the invention is to provide a static pressure sensing device which can be inserted and withdrawn through a small opening in a duct in which it is desired to measure the static pressure of the gas flowing therethrough.

The aforesaid objects are accomplished by providing a universal joint connection member such as a flexible tube element with the sensing point adjacent the end thereof and means, such as a vane-shaped, flexible, foamed polyurethane member, attached to the end of the tube so that the gas stream will cause the sensing point to be aligned with the gas flow.

BRIEF DESCRIPTION OF THE SEVERAL VIEWS OF THE DRAWING

FIG. 1 is an elevational view of a static pressure sensing device constructed in accordance with my invention;

FIG. 2 is a perspective view of the pressure sensing end of the flexible tubing with the means responsive to the direction of gas flow attached thereto; and FIG. 3 is a fragmentary perspective view of the same end of the tubing and a portion of the member responsive to the direction of gas flow.

DETAILED DESCRIPTION

Referring to the drawing, the numeral 1 indicates an elongated narrow rigid tube section made of metal such as aluminum, brass, or other suitable material, such as plastic. Tube section 1 may be of any suitable length so as to enable it to be held by hand or mechanically or otherwise mounted in a fixed position. I prefer to make the tube sections 1 of a length of approximately 9 or 10 inches with an inside diameter of approximately $3/16$ inch and an outside diameter of approximately $1/4$ inch. One end 3 of the tube section 1 is internally threaded in order to enable it to be screw-fastened to the threaded end 5 of narrow rigid tubing 7 which may have an outside diameter of $1/16$ inch and an inside diameter of $1/32$ inch. One end of the tubing 7 is provided with a tapered transition piece 9 having a knurled portion 11, a smooth surface portion 13 and an externally threaded end portion 5 which co-operates with the internal threads of the pipe 1 so that the two can be fastened together. The external diameter of the smooth portion 13 and knurled portion 11 is preferably the same as the external diameter of tube section 1.

The opposite end of tube section 1 is formed with a knurled portion 15, a smooth surface portion 17 and threaded portion 19. Any desired number of tube sections can be screwed together. The threaded portion 19 is of a diameter such that it can be screwed tightly into the internal threaded end portion 3 of another tube section. By providing the knurled portion on the tubing, and on tube sections 1, they can be tightly secured together by hand. The smooth portions 13 and 17 enable flexible tubing to be slipped on in fluid-tight relationship.

The tube 7 should be sufficiently long to permit it to be inserted in the air or other gas duct with the end of the tube approximately in the center of the duct, thereby providing space for the sensing point on the tube to freely align itself in the gas flow. It is preferred to make the tubing as narrow as possible in order to reduce obstruction to gas flow to the minimum and for this reason it is desirable not to insert the device into the gas duct beyond the point where the tube 7 joins the transition piece 9.

Fastened to the other end 21 of the tube 7 is a universal joint connection member, preferably a piece of flexible tubing 23 preferably made of plastic, such as vinyl, which is capable of withstanding the temperature conditions to which it is subjected in the gas duct and which is also chemically resistant to the particular gases to which it is subjected. I prefer to use tubing having an inside diameter of $1/32$ inch and an outside diameter of $3/32$ inch. Tubing 23 is fastened to tubing 7 by slipping it over the end of the tubing for a short distance; for example, $3/8$ to $1/4$ inch. Because the inside diameter of the flexible plastic tubing is smaller than the outer diameter of the tubing 7 it will form a fluid-tight fit. I prefer to use transparent plastic material for the flexible tubing 23 in order to permit visual inspection as to whether or not the tubing is plugged.

Adjacent the other end 25 of tubing 23 is a series of small clean burr-free holes 27 drilled or punched at an angle of 90 degrees circumferentially with regard to the hole immediately laterally adjacent thereto. The holes 27 may have a diameter of approximately .02 inch and be spaced along the tubing at a distance of about 1/16 inch. As shown in the drawing there are four sets of spaced holes, each set consisting of the two holes opposite each other in the tubing wall. More or less than four sets of holes may be drilled or punched in the tubing. The holes are arranged or positioned so that when the flexible tubing is inserted in the gas stream the hole openings on the outside of the tube will be substantially normal to the direction of gas flow.

It is important that the holes 27 be clean and burr-free in order to avoid surface turbulence and consequent ramming or aspiration of the gas enclosed within the tube and universal joint connection member, which, if they occurred, would severely limit the usefulness of the device.

The end set of holes 27 are spaced approximately 1/2 inch from the end 25 of the tubing member 23 in order to allow sufficient room to attach the vane element 29. Although the vane element may be made of any light plastic or other material which is resistant to the chemical action of the gas to which it is subjected and sufficiently light weight to stream out in the gas flow, I prefer to make the vane element 29 out of flexible, foamed polyurethane or other light-weight resilient or flexible foamed plastic which can be compressed or squeezed to a fraction of its normal size and which will recover to substantially its normal size and shape upon release of compression. Foamed polyurethane is the material of choice because it is light in weight and because of its resistance to aging and to adverse chemical reagents and also because of its ability to recover its normal shape and size after having been crushed or compressed. Although other plastic foams or foamed rubber may be used, I have found that flexible foam polyurethane is superior for this purpose. Other foamed plastic or rubber materials which may be used are disclosed on pages 642 to 647 of "Polymers and Resins," by Golding, published by D. Van Nostrand Company, Inc., 1929. Foamed plastics have the advantage over non-cellular materials in that they are more buoyant because of the cellular structure.

The vane element 29 is preferably made in the shape of a four-finned element, spaced 90 degrees apart. The vane element 29 slopes gradually from the narrow end 31 where it is joined to the end of the tubing 25 to the wider end 33. Vane elements of flexible polyurethane foam can be easily produced by cutting the shapes out of a slab or sheet of flexible polyurethane foam having a thickness of approximately 3½ inches. The shapes are cut from the slab by means of a hot wire heated sufficiently to melt the foam adjacent the hot wire and ½ inch of ragged portion of tip trimmed off. Although the vane element 29 which I have used is approximately three inches from one end to the other, the length of the element may be more or less than three inches. The maximum width across the wide end is approximately 1¼ inches and this similarly may vary to some extent. The most desirable size of vane element 29 can be determined empirically for the particular gas flow in which it is to be used. However, I have found that when the element is of the size hereinabove given it performs satisfactorily in hot air and other gas ducts.

The vane element 29 is fastened to the end of tube 25 by forming a recess in the top end 31 by inserting a hot wire sufficiently hot to melt polyurethane foam adjacent the surface of the wire and then inserting the end of the tube 25 into the recess for a distance of abou ¾ inch after applying a suitable adhesive thereto. The end 25 of the tube will be sealed by the adhesive material.

Although we have shown a vane element having four fins it will be apparent that the element can be made with more or less than four fins.

The length of the flexible tubing 23 is not critical. In the device shown and described, the overall length of the tubing is approximately four inches. It should be long enough to allow the gas stream in the duct to cause the tubing to stream out and align itself with the direction of gas flow, but it should be sufficiently short so that the combined length of the tubing and the vane element 29 is not greater than the length of the narrow tubing 7; and preferably the combined length should be somewhat shorter than the length of the tubing 7. The reason for this is that in many commercial operations it is standard practice to provide a small circular opening of about ⅜ inch in diameter in the duct through which the sensing device can be inserted. When the device of this invention is inserted or pushed through a small opening into a duct, the tube 23 is bent over against tubing 7 with the vane element 29 crushed or compressed against the tubing 7 as it passes through the opening. If the vane element 29 extended beyond the transition element 9, it would be crushed against larger diameter tubing section 1, making it difficult if not impossible to force the sensing element into the duct without damaging it. Upon withdrawal of the sensing element from a gas duct the tubing 23 streams outwardly so that the end 31 of the vane becomes the leading edge. Since it is narrower than the end 33 it will pass through the hole with relative ease. It is evident therefore that during both insertion and withdrawal, the end 31 is always the leading end passing through the duct hole.

In the drawings, the device is shown enlarged over the size in which it appears in actual practice. In actual practice the element 29 at the end 31 is only slightly greater in width than the outside diameter of flexible tubing 23 and gradually tapers outwardly to the end 33.

The manner of using the sensing device is simple. The end tube section 1 is fastened by a flexible coupling, by slipping the end of flexible tubing over the smooth portion 17, to a readout device such as a manometer or other pressure gauging device; and the end of the pressure sensing device containing the vane element 29 is inserted through a hole in the gas duct so that the upper end 21 of the tubing 7 is in approximately the center of the duct with the vane element 29 inside the duct. The gas flow in the duct then picks up the vane element 29, causing the end of the tubing 23 containing the sensing holes 27 to be aligned with the direction of gas flow, thereby eliminating inaccuracies caused by turbulence, meandering or angular flow.

As previously stated, the sensing device can be held by hand while measuring static gas pressure in the duct or the device can be mechanically or otherwise mounted in the gas duct in the event it is desired to obtain readings over a longer period of time.

I claim:
1. A static pressure sensing device comprising:
 (a) a rigid, narrow, elongated tube one end of which is adapted to be connected to a pressure indicating device;
 (b) an elongated universal joint connection member having a passageway through the length thereof, one end of which connection is connected to the other end of said rigid tube;
 (c) means, responsive to the direction of gas flow, mounted on the universal joint connection, said means being sufficiently light to respond to the motion of the gas stream the pressure of which is to be determined, and cause the end of said universal joint connection to align itself with the gas flow, and made of material which can be compressed to a fraction of its normal size and recover to substantially its normal size and shape upon release of compression; and (d) said universal joint connection member having burr-free holes adjacent the other end to act as pressure sensing points.

2. A static pressure sensing device in accordance with claim 1 in which:

(e) the universal joint connection member is a flexible tube.

3. A static pressure sensing device in accordance with claim 2 in which:

(f) the rigid tube has a reduced cross-section portion at the end to which the flexible tube is attached.

4. A static pressure device in accordance with claim 2 in which the gas flow responsive means is foamed flexible plastic material shaped with vanes and is mounted on said other end of the flexible tube.

5. A static pressure device in accordance with claim 4 in which the plastic material is polyurethane.

6. A static pressure sensing device in accordance with claim 5 in which the total length of flexible tubing and flow responsive means is not greater than the length of the reduced cross-section portion of the rigid tube.

References Cited

UNITED STATES PATENTS 3,347,095  10/1967  Strong et al. _____ 73—212 XR

DONALD O. WOODIEL, Primary Examiner

U.S. Cl. X.R.

73—178, 212